US012579436B2

(12) United States Patent
Cheng et al.

(10) Patent No.: US 12,579,436 B2
(45) **Date of Patent: \*Mar. 17, 2026**

(54) TENSORIZED LSTM WITH ADAPTIVE SHARED MEMORY FOR LEARNING TRENDS IN MULTIVARIATE TIME SERIES

(71) Applicant: NEC Laboratories America, Inc., Princeton, NJ (US)

(72) Inventors: Wei Cheng, Princeton Junction, NJ (US); Haifeng Chen, West Windsor, NJ (US); Jingchao Ni, Princeton, NJ (US); Dongkuan Xu, Princeton, NJ (US); Wenchao Yu, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 18/451,880

(22) Filed: Aug. 18, 2023

(65) Prior Publication Data

US 2023/0394309 A1     Dec. 7, 2023

Related U.S. Application Data

(63) Continuation of application No. 16/987,789, filed on Aug. 7, 2020, now Pat. No. 11,783,181.

(51) Int. Cl.
| | |
|---|---|
| *G06N 3/08* | (2023.01) |
| *G06F 17/18* | (2006.01) |
| *G06F 18/214* | (2023.01) |
| *G06N 3/044* | (2023.01) |
| *G06N 3/045* | (2023.01) |
| *G06N 5/04* | (2023.01) |

(52) U.S. Cl.
CPC .............. *G06N 3/08* (2013.01); *G06F 17/18* (2013.01); *G06F 18/214* (2023.01); *G06N 3/044* (2023.01); *G06N 3/045* (2023.01); *G06N 5/04* (2013.01)

(58) Field of Classification Search
CPC .......... G06N 3/08; G06N 3/045; G06N 3/044; G06N 5/04; G06F 18/214; G06F 17/18
USPC ......................................... 706/25
See application file for complete search history.

(56) References Cited

U.S. PATENT DOCUMENTS

2020/0356846 A1* 11/2020 Saripalli ............... G06N 3/045

OTHER PUBLICATIONS

Akkad & He, 2019, "A Hybrid Deep Learning Based Approach for Remaining Useful Life Estimation" (Year: 2019).*

(Continued)

*Primary Examiner* — Abdullah Al Kawsar
*Assistant Examiner* — Jun Kwon
(74) *Attorney, Agent, or Firm* — Vincent Duffy; Joseph Kolodka

(57) ABSTRACT

A method for executing a multi-task deep learning model for learning trends in multivariate time series is presented. The method includes collecting multi-variate time series data from a plurality of sensors, jointly learning both local and global contextual features for predicting a trend of the multivariate time series by employing a tensorized long short-term memory (LSTM) with adaptive shared memory (TLASM) to learn historical dependency of historical trends, and employing a multi-task one-dimensional convolutional neural network (1dCNN) to extract salient features from local raw time series data to model a short-term dependency between local time series data and subsequent trends.

20 Claims, 16 Drawing Sheets

(56) References Cited

OTHER PUBLICATIONS

Liu et al, 2016, "Deep Multi-Task Learning with Shared Memory" (Year: 2016).*

Gao et al, 2018, "Share Price Trend Prediction Using CRNN with LSTM Structure" (Year: 2018).*

Qin et al, 2017, "A Dual-Stage Attention-Based Recurrent Neural Network for Time Series Prediction" (Year: 2017).*

Li et al, 2020, "Real-time crash risk prediction on arterials based on LSTM-CNN" (Year: 2020).*

Yu et al, 2018, "A Multi-Layer Parallel LSTM Network for Human Activity Recognition with Smartphone Sensors" (Year: 2018).*

Liu et al, Jan. 2020, "An adversarial bidirectional serial-parallel LSTM-based QTD framework for product quality prediction" (Year: 2020).*

* cited by examiner

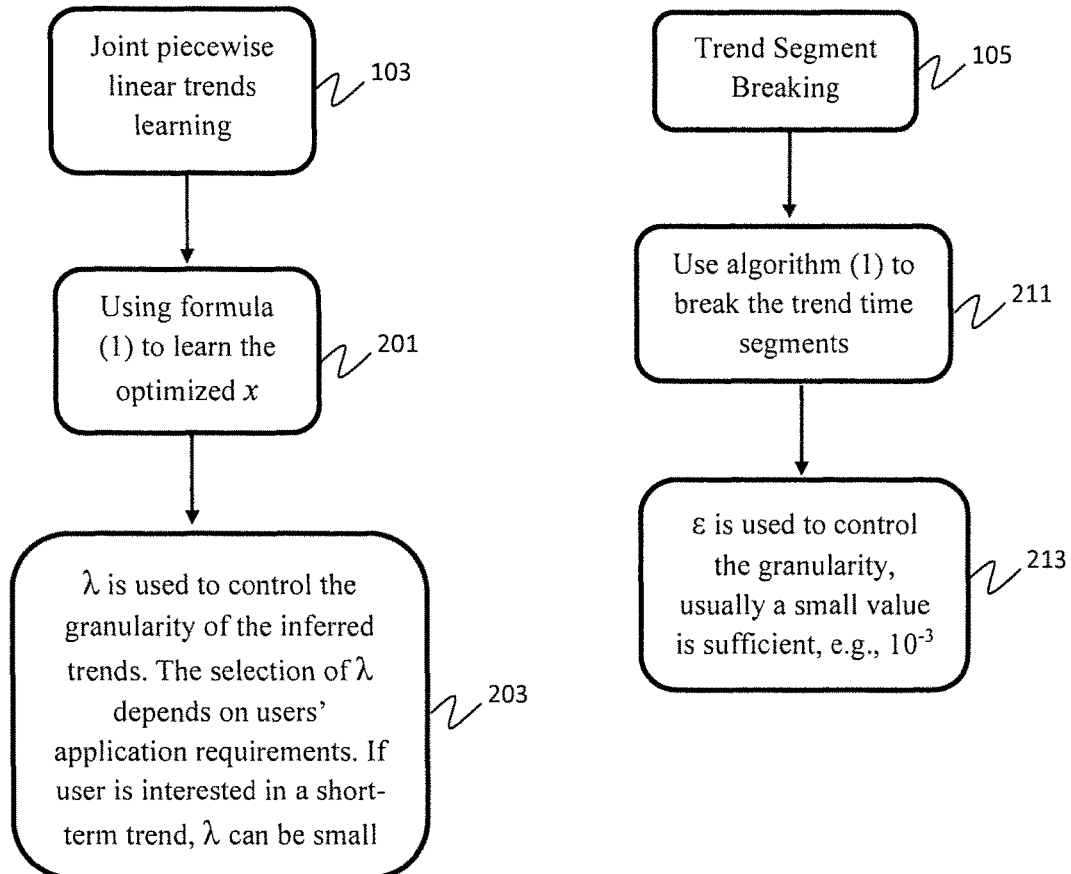

Joint piecewise linear trends learning — 103

Using formula (1) to learn the optimized $x$ — 201

$\lambda$ is used to control the granularity of the inferred trends. The selection of $\lambda$ depends on users' application requirements. If user is interested in a short-term trend, $\lambda$ can be small — 203

Trend Segment Breaking — 105

Use algorithm (1) to break the trend time segments — 211

$\varepsilon$ is used to control the granularity, usually a small value is sufficient, e.g., $10^{-3}$ — 213

Formula 1

$$\sum_{t=1}^{T} \|\hat{\mathbf{y}}_t - \hat{\mathbf{x}}_t\|_2^2 + \lambda \sum_{t=2}^{T-1} \|\hat{\mathbf{x}}_{t-1} - 2\hat{\mathbf{x}}_t + \hat{\mathbf{x}}_{t+1}\|_2 \text{, where } \hat{\mathbf{y}}_t, \hat{\mathbf{x}}_t \in \mathbb{R}^k$$

Algorithm 1

```
for t = 1 to T − 2
        for i = 1 to k
            if  || x̂_{t+2}(i) − 2 x̂_{t+1}(i) + x̂_t(i) ||_2 > ε

Break time series at t+1;
                break;
```

FIG. 2

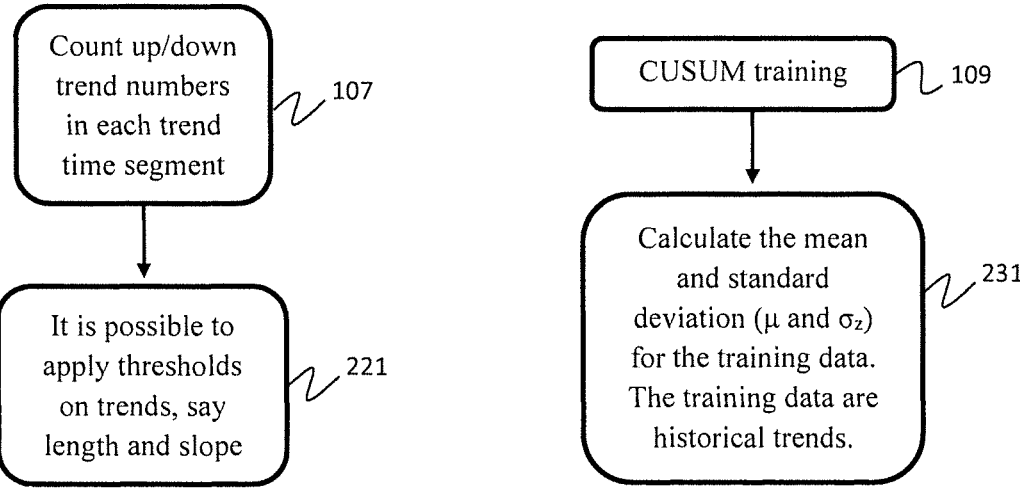

Count up/down trend numbers in each trend time segment — 107

It is possible to apply thresholds on trends, say length and slope — 221

CUSUM training — 109

Calculate the mean and standard deviation ($\mu$ and $\sigma_z$) for the training data. The training data are historical trends. — 231

CUSUM monitoring for change detection — 111

Using formula (2), to calculate $S_n$. If it arrives at some threshold, the system triggers a changing alert. — 241

Formula 2

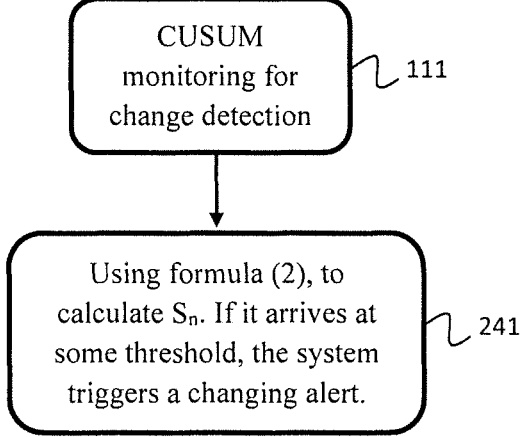

$$S_n = \sum_{i=1}^{n} (z_n - \mu) / \sigma_z$$

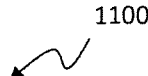

Learning piecewise linear trends for all time series jointly $$\sum_{t=1}^{T} \|\hat{\mathbf{y}}_t - \hat{\mathbf{x}}_t\|_2^2 + \lambda \sum_{t=2}^{T-1} \|\hat{\mathbf{x}}_{t-1} - 2\hat{\mathbf{x}}_t + \hat{\mathbf{x}}_{t+1}\|_2 \text{, where } \hat{\mathbf{y}}_t, \hat{\mathbf{x}}_t \in \mathbb{R}^k$$

CUSUM $$S_n = \sum_{i=1}^{n} (z_n - \mu) / \sigma_z$$

Attention Module $$\alpha_{ij} = \frac{\exp\{\mathbf{w}_i^\top \tanh(\mathbf{V}_i \mathbf{h}_t^{(j)})\}}{\sum_{k=1}^{q} \exp\{\mathbf{w}_i^\top \tanh(\mathbf{V}_i \mathbf{h}_t^{(k)})\}}$$

Objective Function $$J = \frac{1}{n} \sum_{i=1}^{n} \frac{1}{z^i} \sum_{k=1}^{z^i} \left[ (\hat{l}_k^i - l_k^i)^2 + (\hat{s}_k^i - s_k^i)^2 \right] + \lambda P_{nn}$$

FIG. 11

Learning and Forecasting Trends in Multivariate Time Series Data

1201

System Monitoring

1203

Health Care

1205

Stock Market

1207

Financial Fraud

1209

Gas Detection

1211

E-Commerce

101

Input a multi-variate time-series

103

Joint piecewise linear trends learning

1301

Training TLASM model using historical trend sequences and local time series

1303

Predict future trend's slope and length

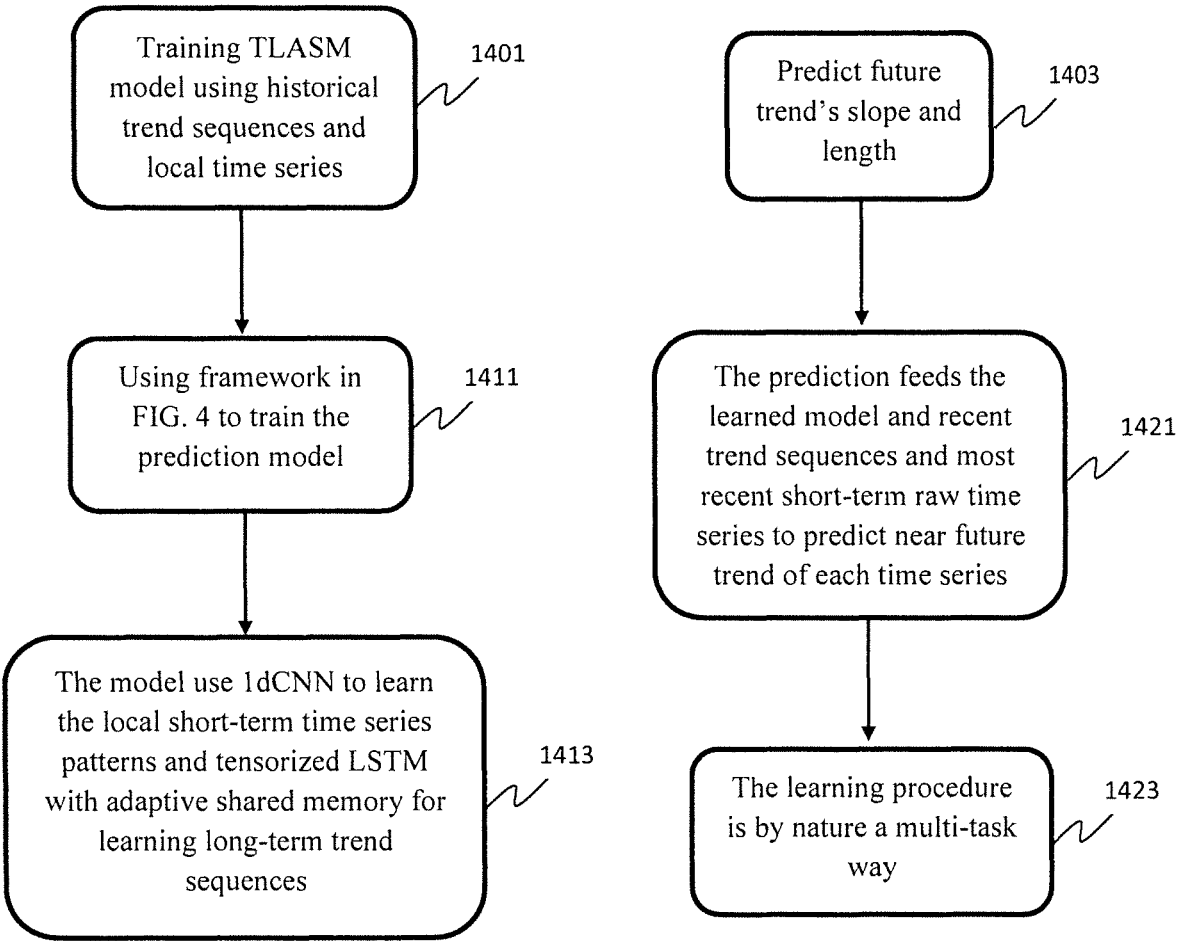

Training TLASM model using historical trend sequences and local time series — 1401

Using framework in FIG. 4 to train the prediction model — 1411

The model use 1dCNN to learn the local short-term time series patterns and tensorized LSTM with adaptive shared memory for learning long-term trend sequences — 1413

Predict future trend's slope and length — 1403

The prediction feeds the learned model and recent trend sequences and most recent short-term raw time series to predict near future trend of each time series — 1421

The learning procedure is by nature a multi-task way — 1423

FIG. 14

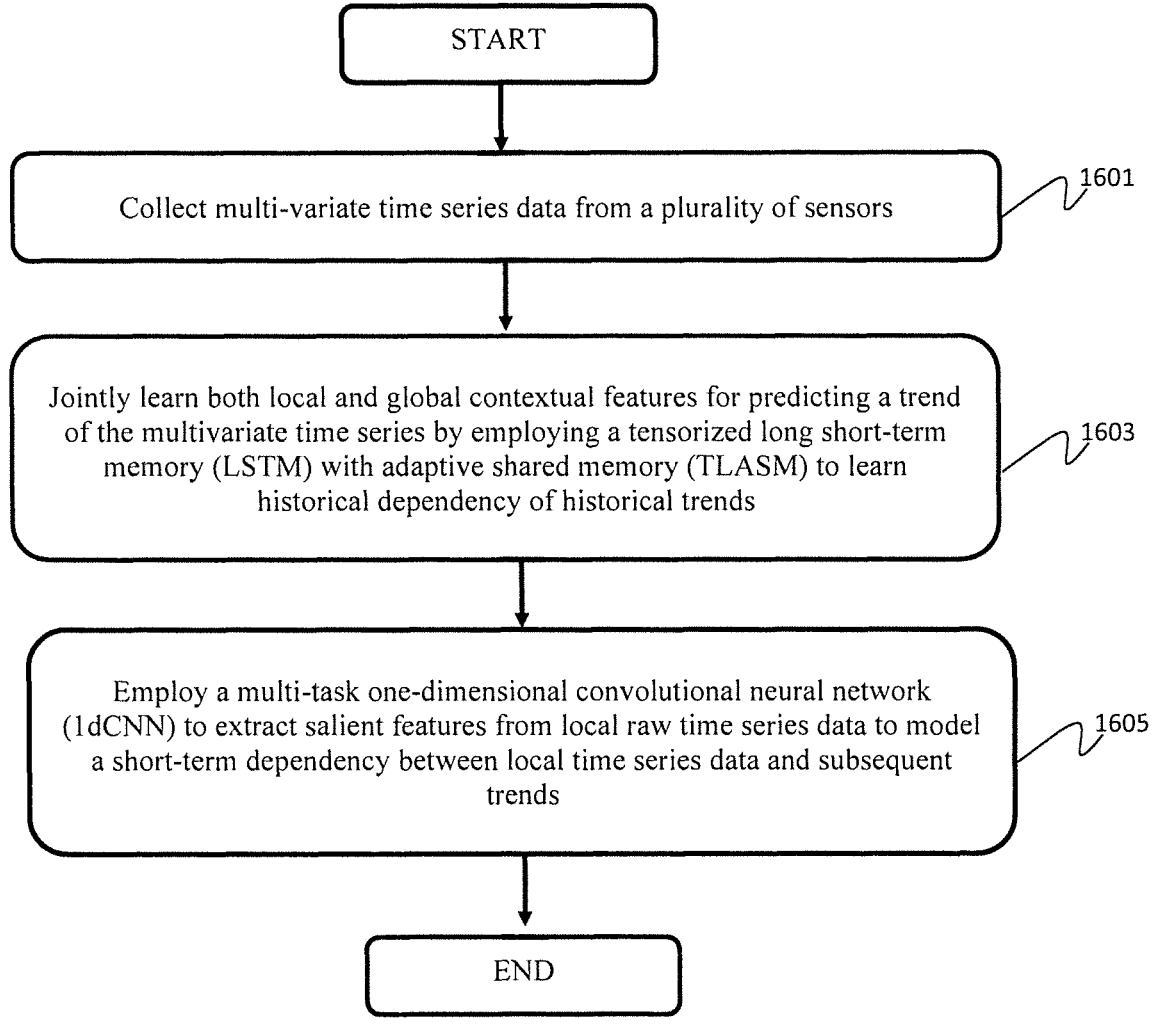

START

Collect multi-variate time series data from a plurality of sensors — 1601

Jointly learn both local and global contextual features for predicting a trend of the multivariate time series by employing a tensorized long short-term memory (LSTM) with adaptive shared memory (TLASM) to learn historical dependency of historical trends — 1603

Employ a multi-task one-dimensional convolutional neural network (1dCNN) to extract salient features from local raw time series data to model a short-term dependency between local time series data and subsequent trends — 1605

END

FIG. 16

TENSORIZED LSTM WITH ADAPTIVE SHARED MEMORY FOR LEARNING TRENDS IN MULTIVARIATE TIME SERIES

RELATED APPLICATION INFORMATION

This application is a continuing application of U.S. patent application Ser. No. 16/987,789 filed 7 Aug. 2020, which claims the benefit of U.S. Provisional Patent Application Ser. No. 62/892,095, filed on 27 Aug. 2019 and of U.S. Provisional Patent Application Ser. No. 62/892,615, filed on 28 Aug. 2019, all of which are incorporated by reference in their entireties, incorporated herein by reference in its entirety.

BACKGROUND

Technical Field

The present invention relates to trends in time series data and, more particularly, to methods and systems for unsupervised multivariate time series trend detection for group behavior analysis and tensorized long short-term memory (LSTM) with adaptive shared memory for learning trends in multivariate time series.

Description of the Related Art

A large amount of time series data has been generated from various domains, such as traffic management, electricity consumption and algorithmic trading. Trend learning in time series data aims to analyze the evolving trends in time series and forecast the trend. Trend learning is attractive because it can deliver more information about the semantics and dynamics of the underlying process generating the time series compared to conventional prediction methodologies. There has been a lot of effort on learning trends in time series data.

SUMMARY

A computer-implemented method for unsupervised multivariate time series trend detection for group behavior analysis is presented. The method includes collecting multivariate time series data from a plurality of sensors, learning piecewise linear trends jointly for all of the multi-variate time series data, dividing the multi-variate time series data into a plurality of time segments, counting a number of up/down trends in each of the plurality of time segments, for a training phase, employing a cumulative sum (CUSUM), and, for a testing phase, monitoring the CUSUM for trend changes.

A non-transitory computer-readable storage medium comprising a computer-readable program is presented for unsupervised multivariate time series trend detection for group behavior analysis, wherein the computer-readable program when executed on a computer causes the computer to perform the steps of collecting multi-variate time series data from a plurality of sensors, learning piecewise linear trends jointly for all of the multi-variate time series data, dividing the multi-variate time series data into a plurality of time segments, counting a number of up/down trends in each of the plurality of time segments, for a training phase, employing a cumulative sum (CUSUM), and, for a testing phase, monitoring the CUSUM for trend changes.

A system for unsupervised multivariate time series trend detection for group behavior analysis is presented. The system includes a memory and one or more processors in communication with the memory configured to collect multi-variate time series data from a plurality of sensors, learn piecewise linear trends jointly for all of the multi-variate time series data, divide the multi-variate time series data into a plurality of time segments, count a number of up/down trends in each of the plurality of time segments, for a training phase, employ a cumulative sum (CUSUM), and, for a testing phase, monitor the CUSUM for trend changes.

A computer-implemented method for executing a multi-task deep learning model for learning trends in multivariate time series is presented. The method includes collecting multi-variate time series data from a plurality of sensors, jointly learning both local and global contextual features for predicting a trend of the multivariate time series by employing a tensorized long short-term memory (LSTM) with adaptive shared memory (TLASM) to learn historical dependency of historical trends, and employing a multi-task one-dimensional convolutional neural network (1dCNN) to extract salient features from local raw time series data to model a short-term dependency between local time series data and subsequent trends.

A non-transitory computer-readable storage medium comprising a computer-readable program is presented for executing a multi-task deep learning model for learning trends in multivariate time series, wherein the computer-readable program when executed on a computer causes the computer to perform the steps of collecting multi-variate time series data from a plurality of sensors, jointly learning both local and global contextual features for predicting a trend of the multivariate time series by employing a tensorized long short-term memory (LSTM) with adaptive shared memory (TLASM) to learn historical dependency of historical trends, and employing a multi-task one-dimensional convolutional neural network (1dCNN) to extract salient features from local raw time series data to model a short-term dependency between local time series data and subsequent trends.

A system for executing a multi-task deep learning model for learning trends in multivariate time series is presented. The system includes a memory and one or more processors in communication with the memory configured to collect multi-variate time series data from a plurality of sensors, jointly learn both local and global contextual features for predicting a trend of the multivariate time series by employing a tensorized long short-term memory (LSTM) with adaptive shared memory (TLASM) to learn historical dependency of historical trends, and employ a multi-task one-dimensional convolutional neural network (1dCNN) to extract salient features from local raw time series data to model a short-term dependency between local time series data and subsequent trends.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 are block/flow diagrams of joint piecewise linear trends learning and trend segment breaking, in accordance with embodiments of the present invention;

FIG. 3 are block/flow diagrams of count up/down trend numbers in each trend time segment, CUSUM training, and CUSUM monitoring for change detection, in accordance with embodiments of the present invention;

FIG. 11 is a block/flow diagram of equations employed in an exemplary method for unsupervised multivariate time series trend detection for group behavior analysis, in accordance with embodiments of the present invention;

FIG. 14 are block/flow diagrams of training the TLASM model and predicting future trend's slope and length, in accordance with embodiments of the present invention;

FIG. 16 is a block/flow diagram of an exemplary method for tensorized LSTM with adaptive shared memory for learning trends in multivariate time series, in accordance with embodiments of the present invention.

DETAILED DESCRIPTION OF PREFERRED EMBODIMENTS

Figure 1:
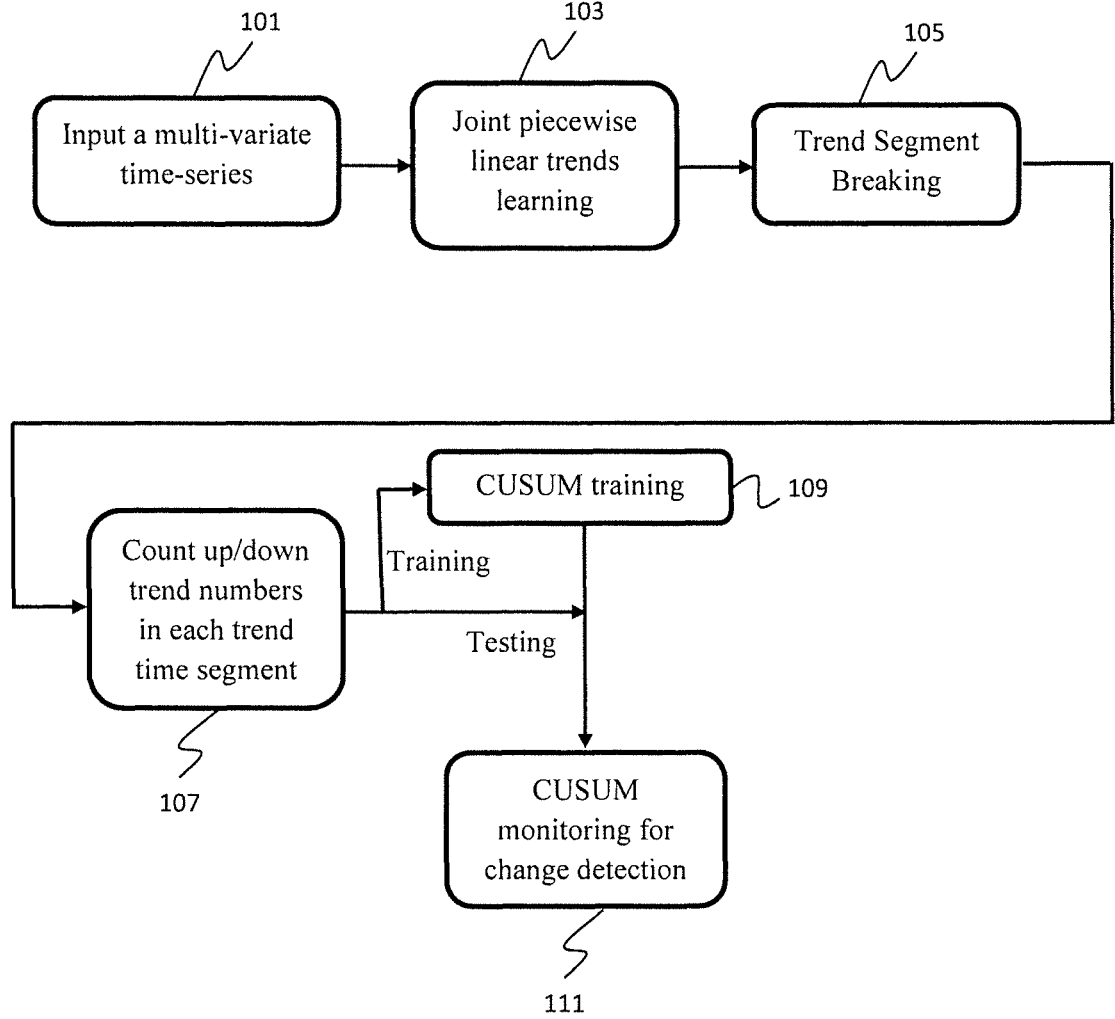
FIG. 1 is a block/flow diagram of a method for unsupervised multivariate time series trend detection for group behavior analysis, in accordance with embodiments of the present invention.

In many real-world applications, time series data is in the form of multivariate. Hence, trend learning is further extended to multivariate time series data. Trend learning in multivariate time series is difficult because of complex temporal patterns hidden in the multivariate time series, especially the existence of dependencies among the time series in the group. In many applications, the time series in a group share similar trend patterns. For example, traffic congestion that happens on a road causes all vehicles on the road to slow down. Thus, the number and the average speed of cars slowing down in a road segment are the indicator of possible traffic congestion. Another example relates to complex system monitoring. In a cyber-physical system, sensors are deployed to monitor each device and record time series data. When the number of increasing (uptrend) or decreasing (down-trend) time series in a subsystem is increasing, there should be some system anomaly in that subsystem.

In one example of single time series trend detection, the exemplary embodiments detect a trend in each time period. For each local trend, exemplary embodiments need to detect a time length and a slope. The exemplary embodiments can have threshold on length and slope to maintain only a subset of trends. The multivariate time series in the same group, e.g., stocks in the same sector or vehicle speed in the same road segment during a period time, usually has similar trend patterns. The challenge is how to detect the trend of the group as a whole characteristic for group behavior analysis.

To address such issue, the exemplary embodiments use an $l_1$ trend filtering method on the whole multi-variate time series. The exemplary embodiments learn the piecewise linear trends for all the time series jointly using the following equation:

$$\sum_{t=1}^{T}\|\hat{y}_t - \hat{x}_t\|_2^2 + \lambda\sum_{t=2}^{T-1}\|\hat{x}_{t-1} - 2\hat{x}_t + \hat{x}_{t+1}\|_2, \text{ where } \hat{y}_t, \hat{x}_t \in \mathbb{R}^k$$

Here, $y_t$ is the original multi-variate time series values at time step t, which is a k-dimensional vector ($\mathbb{R}^{k\times 1}$). $x_t$ (t=1 to T) is the estimated value to be optimized. The first term of the above equation is the residual term and the second term is the smoothness term. $\lambda$ is used to control the granularity of the inferred trends. Basically, if $\lambda$ is larger, the resulting trend would be coarse grained.

After the optimization, the exemplary embodiments use the estimated $x_t$ to break the multivariate time series into different segments as shown in the following steps, pseudo code:

```
for t = 1 to T − 2
    for i = 1 to k
        | | x̂_{t+2} (i)- 2 x̂_{t+1} (i)+ x̂_t (i) | | _2 > ε
    if
        Break time series at t+1;
        break;
```

Once the exemplary embodiments break the optimized $x_t$ into piece-wise linear trend segments, the method can further count the number of up/down trends in each time segment. The resulting counts time series describe the trend evolution of the whole multi-variate time series.

The exemplary embodiments denote the number of uptrends as $z_n$ ($1 \le n \le N$). N is the total number of trend segments. This is similar for the downtrend cases. The exemplary embodiments can then use cumulative sum (CUSUM) to monitor the group of time series (multi-variate time series) trends. When the cumulative sum of deviations is larger than some threshold $\theta$, the exemplary embodiments report that the group of time series has an increasing uptrend. If the CUSUM value is less than $\theta$, the method reports that the group has a decreasing uptrend.

The equation of calculating CUSUM is as follows:

$$S_n = \sum_{i=1}^{n}(z_n - \mu)/\sigma_z$$

Here, $\mu$ is the mean value of z in the training period, $\sigma_z$ is the standard error of z in the training period.

FIG. 1 is a block/flow diagram of a method for unsupervised multivariate time series trend detection for group behavior analysis, in accordance with embodiments of the present invention.

At block 101, a multi-variate time series is input.

At block 103, joint piecewise linear trends are learned.

At block 105, trend segment breaking (or dividing) is determined.

At block 107, the trend numbers in each trend time segment are counted up/down.

At block 109, for the training phase, cumulative sum (CUSUM) training is performed.

At block 111, for the testing phase, CUSUM monitoring for change detection is performed.

FIG. 2 are block/flow diagrams of joint piecewise linear trends learning and trend segment breaking, in accordance with embodiments of the present invention.

At block 103, joint piecewise linear trends are learned.

At block 201, formula (1) is employed to learn optimized x.

At block 203, $\lambda$ is used to control the granularity of the inferred trends. The selection of depends on users' application requirements. If the user is interested in a short-term trend, $\lambda$ can be small.

At block 105, trend segment breaking (or dividing) is determined.

At block 211, algorithm (1) is used to break the trend time segments.

At block 213, $\varepsilon$ is used to control the granularity, and usually a small value is sufficient, e.g., $10^{-3}$.

FIG. 3 are block/flow diagrams of count up/down trend numbers in each trend time segment, CUSUM training, and CUSUM monitoring for change detection, in accordance with embodiments of the present invention.

At block 107, the trend numbers in each trend time segment are counted up/down.

At block 221, it is possible to apply thresholds on trends, say a length and a slope.

At block 109, for the training phase, cumulative sum (CUSUM) training is performed.

At block 231, the mean and standard deviation (and $6z$) are calculated for the training data. The training data are historical trends.

At block 111, for the testing phase, CUSUM monitoring for change detection is performed.

At block 241, formula (2) is employed to calculate $S_n$. If it arrives at some threshold, the system triggers a changing alert.

Therefore, regarding unsupervised multivariate time series trend detection for group behavior analysis, trends in multivariate time series characterize the movement of time series. Learning and forecasting time series movements is invaluable to various real-world applications, such as traffic management, electricity consumption, and algorithmic trading. Given the historical data of each time series, the exemplary embodiments aim to forecast the slope and duration of the subsequent trend of each time series. This task is challenging because of the complex temporal patterns of multivariate time series and the uncertainty in the relations between different time series.

The exemplary embodiments below introduce a novel deep neural network model, namely tensorized LSTM with adaptive shared memory (TLASM), to resolve such challenges. TLASM employs the tensorized LSTM in which the hidden states are represented by tensors to model the tem-poral patterns of multivariate time series trends. With an adaptive shared memory, TLASM is able to learn the relation between time series adaptively. The tensorized LSTM helps TLASM enjoy the advantage of multi-task learning in which the trend learning of each time series is considered as a task. The adaptive shared memory makes the more related tasks share more model parameters. Furthermore, with the tensorized LSTM applied to time series trends and the one-dimensional convolutional neural network (1dCNN) applied to local time series data, the long-term dependency within the sequence of historical trends and the short-term dependency between the local raw time series data and the subsequent trend are considered.

The problem of learning and forecasting underlying trends in time series data arises in a variety of applications, such as traffic management, energy optimization, etc. A trend in time series is characterized by the slope and duration, and its prediction is then to forecast the two values of the subsequent trend given historical data of the time series. For this problem, existing approaches mainly deal with the case in univariate time series.

However, in many real-world applications, there are multiple variables at play, and handling all of them at the same time is beneficial for an accurate prediction. A natural way is to employ multi-task learning (MTL) techniques in which the trend learning of each time series is treated as a task. The key point of MTL is to learn task relatedness to achieve better parameter sharing, which however is challenging in trend prediction tasks. First, effectively modeling the complex temporal patterns in different tasks is difficult as the temporal and spatial dimensions are entangled. Second, the relatedness among tasks may change over time.

The exemplary embodiments address such issues by introducing a neural network, referred to as DeepTrends, for multivariate time series trend prediction. The core module of DeepTrends is a tensorized LSTM with adaptive shared memory (TLASM). TLASM employs the tensorized LSTM to model the temporal patterns of long-term trend sequences in an MTL setting. With an adaptive shared memory, TLASM is able to learn the relatedness among tasks adaptively, based upon which TLASM can dynamically vary degrees of parameter sharing among tasks. To further consider short-term patterns, DeepTrends utilizes a multi-task 1dCNN to learn the local time series features and employs a task-specific sub-network to learn a mixture of long-term and short-term patterns for trend prediction.

In the MTL setting, the trend learning of each time series is considered as a task and different tasks are performed jointly. MTL can help improve the performance of tasks when they are related, and MTL also saves the computation cost by sharing model architectures (parameters) between related tasks. However, the MTL model may suffer significant degeneration in performance when tasks are less related to each other.

Figure 4:
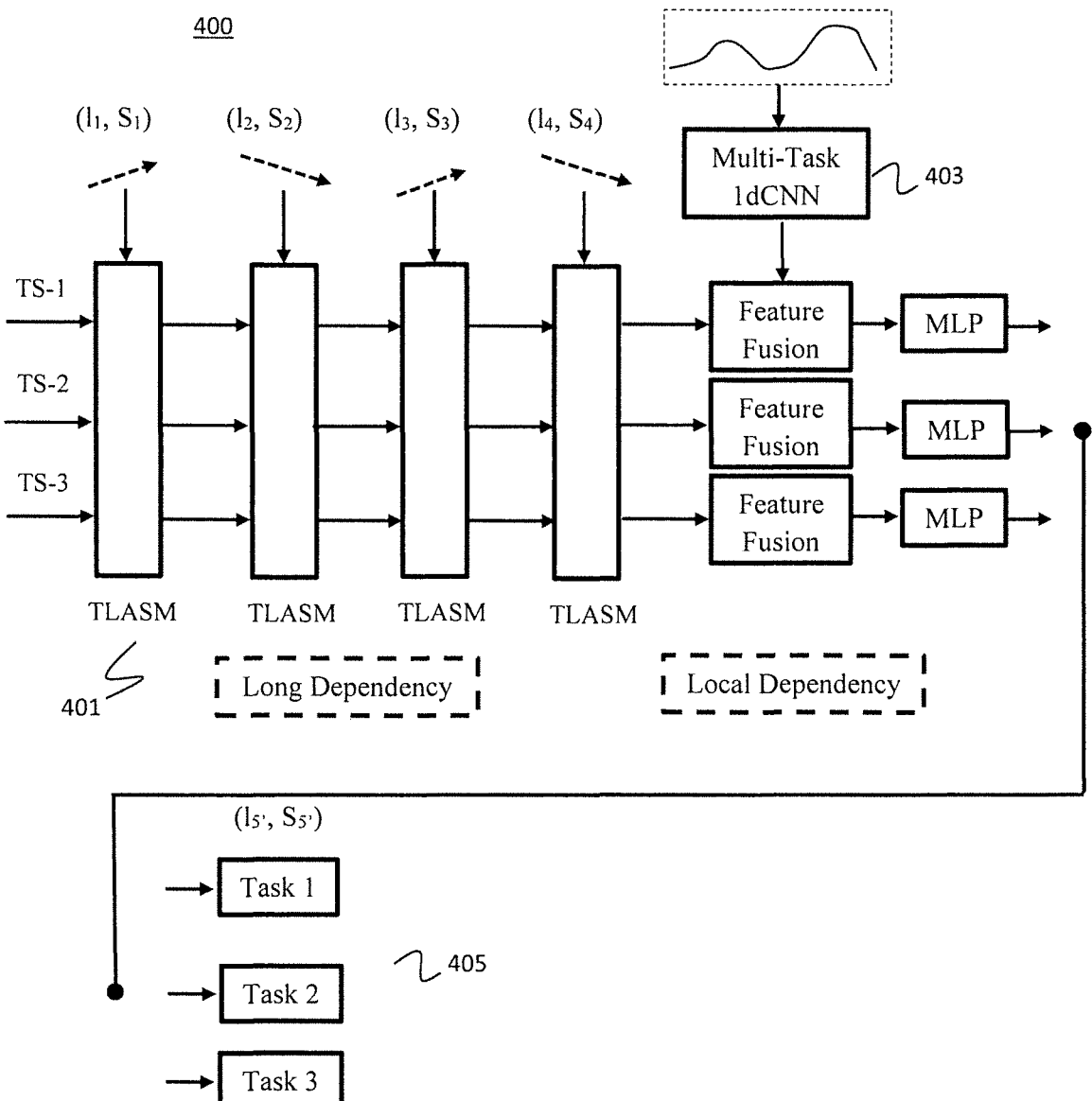
FIG. 4 is a block/flow diagram of trend prediction in multivariate time series, in accordance with embodiments of the present invention.
Figure 5:
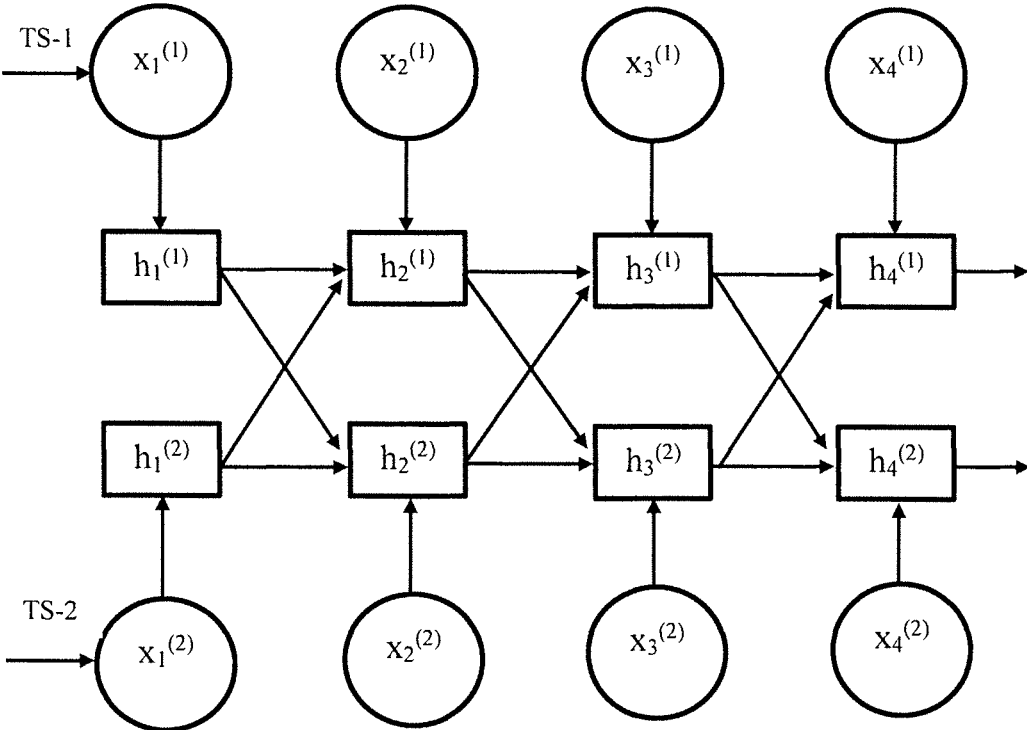
FIG. 5 is block/flow diagram of a basic multi-task learning (MTL) setting, in accordance with embodiments of the present invention.
Figure 6:
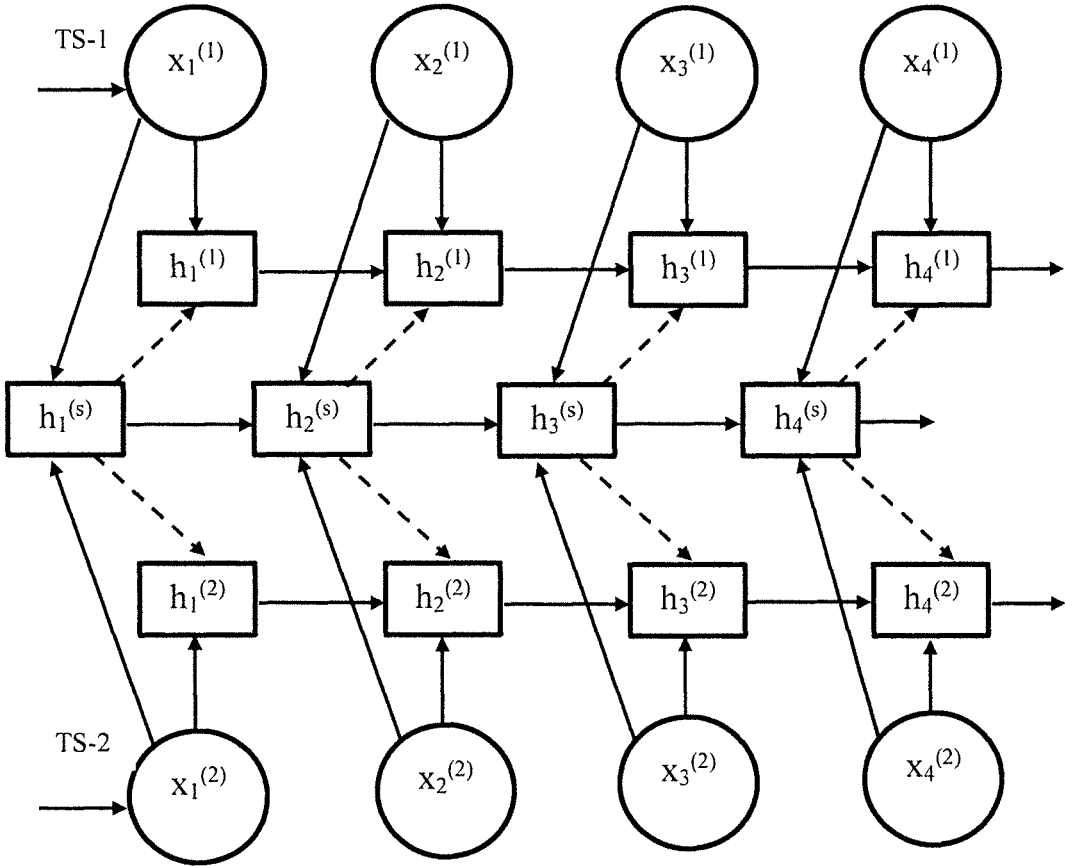
FIG. 6 is block/flow diagram of an enhanced multi-task learning (MTL) setting, in accordance with embodiments of the present invention.

FIG. 5 illustrates a basic MTL model 500 for modeling the temporal patterns of two time series, where each time series has its own parameters to generate hidden representations and the hidden representations of different time series influence each other by additional shared parameters. Compared to models without parameter sharing, the basic MTL model introduces inductive bias into the shared architecture. When tasks are unrelated, the inductive biases in different tasks will have conflicts and hurt task performance. To alleviate this problem, a memory enhanced model that decouples the hidden representations into the task specific patterns and the shared ones can be employed. The architecture of the enhanced MTL 600 is shown in FIG. 6, in which an external memory is designed to share information among different tasks. However, the shared memory cannot model task relatedness for better parameter-sharing. Another challenge comes from the temporal dynamics in different tasks. In many cases, the relatedness among tasks may change over time. However, FIG. 4 can be employed to alleviate issues related to the basic MTL 500 and the enhanced MTL 600.

FIG. 4 is a block/flow diagram of trend prediction in multivariate time series, in accordance with embodiments of the present invention.

To address the above challenges, the exemplary embodiments introduce a deep architecture, referred to as Deep-Trends 400, for learning trends in multivariate time series as shown in FIG. 4. DeepTrends jointly learns both local and global contextual features for predicting the trend of time series. DeepTrends core module is a tensorized LSTM with adaptive shared memory (TLASM 401) to learn the sequential dependency of historical trends, which carries the information about long-term trend evolving. To further consider short-term dependency, DeepTrends utilizes a multitask 1dCNN 403 to learn the features of local raw time series, which delivers the information about the abrupt changing behavior of the trend evolution.

Specifically, TLASM 401 leverages the tensorized LSTM to model the complex temporal patterns in different tasks, based upon which, an adaptive shared memory is designed to learn the task relatedness and dynamically integrate the shared information from related tasks into the representation of each individual task. The adaptive shared memory includes multiple layers of sub-networks. TLASM 401 learns the sub-network connections between different layers for information routing. In this way, one learning task can share more parameters with more related ones by selecting a similar sub-network. Each task is associated with one task specific unit at each time step for dynamical information routing. The idea of sub-network routing has not been previously used for the sequential model. Moreover, time series data often involves a mixture of long-term and short-term patterns. In DeepTrends, TLASM 401 is employed to model the long-term dependency within the sequence of historical trends. Since CNN is good at extracting patterns of local salience by applying a local connectivity between neurons, DeepTrends further employs a multi-task 1dCNN 403 to extract salient features from local raw time series data, so as to model the short-term dependency between local time series data and the subsequent trend. A task-specific sub-network is then designed to integrate the long- and short-term dependency.

The advantages of the present application can be summarized as follows:

The exemplary embodiments present DeepTrends, a multi-task deep learning model for learning trends in multivariate time series, which considers both long- and short-term dependency.

The exemplary embodiments introduce TLASM, which is the first neural network capable to jointly model the temporal patterns of multivariate time series and achieve flexible parameter sharing.

The exemplary embodiments extend the problem setting into a multivariate one. n time series is denoted by $X=(x^1, \ldots, x^n)^T=(x_1, \ldots, x_T) \in \mathbb{R}^{n \times T}$, where$=(x_1^i, \ldots, x_T^i)^T \mathbb{R}^T$ is the i-th time series and $x_t=(x_t^1, \ldots, x_t^n) \in \mathbb{R}^n$ represents the vector of n time series at time step t. T is the number of time steps. The historical trend sequence of X is the union of the trend sequence over each time series and denoted by $\mathcal{T}=\{$ $\langle l_k^1, s_k^1 \rangle\} \cup \ldots \cup \{\langle l_k^n, s_k^n \rangle\}$, where $\{\langle l_k^i, s_k^i \rangle\}$ is the trend sequence of the i-th time series. $\langle l_k^i, s_k^i \rangle$ is the k-th trend of the i-th time series and describes a function over a subsequence (or a segment) of the i-th time series. $l_k^i$ and $s_k^i$ represent the duration and slope of the k-th trend in the i-th time series respectively. $l_k^i$ is measured in terms of the time range covered by the k-th trend of the i-th time series. Both $l_k^i$ and $s_k^i$ are continuous values. Trends of X are time ordered and non-overlapping. The durations of all the trends in each time series address $\Sigma_k l_k^i = T$.

The local time series data delivers the information about the abrupt changing behavior of the trend evolution. The local data with respect to each historical trend is defined as the time series data with window size w.

The local data of X is denoted by: $\mathcal{L}=\{\langle x_{t_k-w}^1, \ldots, x_{t_k}^1$ $\rangle\} \cup \ldots \cup \{\langle x_{t_k-w}^n, \ldots, x_{t_k}^n \rangle\}$, where $\langle x_{t_k-w}^i, \ldots, x_{t_k}^i \rangle$ is the local data of the k-th trend of the i-th time series and $t_k$ is the ending time of the k-th trend. Given $\mathcal{T}$ and $\mathcal{L}$, the goal is to learn the trends in multivariate time series for forecasting the subsequent trend of each time series, e.g., $\langle \hat{l}^1, \hat{s}^1 \rangle, \ldots \langle \hat{l}^n, \hat{s}^n \rangle$.

Data instances are built by combining the historical trend sequence, local raw time series data and the subsequent trends. All data instances are split into training set (80%), validation set (10%) and test set (10%). To generate trends, the exemplary embodiments adopt the $l_1$ trend filtering for multivariate time series.

The objective function is:

$$\sum_{t=1}^{T} \|\hat{x}_t - x_t\|_2^2 + \mu \sum_{t=2}^{T-1} \|\hat{x}_{t-1} - 2\hat{x}_t + \hat{x}_{t+1}\|_2$$

where $x_t \in \mathbb{R}^n$ is the time series data at time step t and $\hat{x}_t$ is the estimate.

Using a similar idea in the group Lasso, the objective function couples together changes in the slopes of individual entries at the same time index, so the trend component found tends to show simultaneous trend changes. It is noted that even though the trends in multivariate time series are asynchronous, the trend is split into smaller pieces and maintains the predictive power. In the objective function, µ is a parameter to control the number of generated trends. The smaller µ is, the more fine-grained the trends are. The specific value of µ depends on the user's need.

The exemplary embodiments first introduce the basic LSTM, followed by how to extend it into the tensorized one with adaptive shared memory.

The LSTM network is a powerful approach to learn the long-term dependency of sequential data. The calculation process of the LSTM unit (applied to each time step) is described with respect to the equations below.

Given a sequence of input data $x_1, x_2, \ldots \in \mathbb{R}^n$, a memory cell $c_t \in \mathbb{R}^d$ and a hidden state $h_t \in \mathbb{R}^d$ are calculated for each input data by the following equations:

$$\begin{bmatrix} \tilde{c}_t \\ f_t \\ i_t \\ o_t \end{bmatrix} = \begin{bmatrix} \tanh \\ \sigma \\ \sigma \\ \sigma \end{bmatrix} (W[x_t \otimes h_{t-1}] + b),$$

$$c_t = f_t \odot c_{t-1} + i_t \odot \tilde{c}_t,$$

-continued $$h_t = o_t \odot \tanh(c_t),$$

where $W \in \mathbb{R}^{4d \times (N+d)}$ and $b \in \mathbb{R}^{4d}$ are parameters.

$f_t$, $i_t$, $o_t \in \mathbb{R}^d$ are called forget, input, output gates, respectively, and their values are in the range of $[0,1]$. These gates control how much information to keep/throw away.

$\sigma(\cdot)$, $\oplus$ and $\odot$ represent an element-wise sigmoid function, concatenation operator, and an element-wise multiplication, respectively. The LSTM unit can be rewritten as follows, where $\theta$ represents all the parameters.

$$(h_t, c_t) = \mathrm{LSTM}(h_{t-1}, c_{t-1}, x_t, \theta)$$

The exemplary method can take the concatenation of the duration $l_k^i$ and slope $s_k^i$ as the input data $i_k^i$, and feed this concatenation in each trend of all time series into LSTM to learn the long-term trend dependency. After feeding the trend sequence $\mathcal{T}$ into LSTM, the hidden state $h_t$ at the last time step is used as the overall representation of the trend sequences.

Individual time series usually present different dynamics. However, as the basic LSTM blindly blends the information of all time series into the hidden state $h_t$, it is intractable to further learn the time series-specific representations. Besides, the relatedness among the trend learning tasks of different time series cannot be modeled by the hidden state mixing multivariate data, thus potentially hurting the trend learning task performance.

The exemplary methods tensorize the hidden states to learn the time series specific representation, such that the hidden representation of each time series can be learned exclusively based on the data from that time series.

The intuition behind tensorizing hidden states is that the exemplary method $\mathbb{R}$ represents the hidden state as a matrix, $H_t = (h_t^1, \ldots, h_t^n)^T$, where $h_t^i \in \mathbb{R}^{d_0}$ is the hidden state vector specific to the ith time series. The data used to generate $h_t^i$ is exclusively related to the i-th time series.

Given the newly coming data $x_t \in \mathbb{R}^n$ and the previous state matrix $H_{t-1}$, the hidden state is updated as follows:

$$\tilde{C}_t = \tan h(W_c \oplus x_t + U_c \otimes_n H_{t-1} + B_c)$$

where $\tilde{C}_t = (\tilde{c}_t^1, \ldots, \tilde{c}_t^n)^T$ has the same shape of the hidden state matrix $H_{t-1}$. The element $\tilde{c}_t^i \in \mathbb{R}^{d_0}$ corresponds to the hidden state update of the i-th time series.

$W_c = (w_c^1, \ldots, w_c^n)^T \in \mathbb{R}^{n \times d_0}$ is the input-to-hidden transition matrix, where $w_c^i \in \mathbb{R}^{d_0}$. $W_c \oplus w_t$ captures the information from the input data and is defined by:

$$W_c \oplus x_t = (w_x^1 x_t^1, \ldots, w_x^n x_t^n)^T.$$

$U_c = (U_c^1, \ldots, U_c^n)^T \in \mathbb{R}^{n \times d_0 \times d_0}$ is the hidden-to-hidden transition tensor, where $U_c^i \in \mathbb{R}^{d_0 \times d_0}$. $U_c \otimes_n H_{t-1}$ captures the information from the previous state matrix:

$$U_c \otimes_n H_{t-1} = (U_c^1 h_{t-1}^1, \ldots, U_h^n h_{t-1}^n)^T$$

where $\otimes_n$ indicates the tensor product along the axis of n.

From an MTL viewpoint, tensorizing hidden states transform the hidden state update of multivariate time series into multiple independent tasks, each of which corresponds to a time series. Thus, MTL helps learning time series-specific representations. However, MTL cannot model the task relatedness.

The exemplary methods introduce an adaptive shared memory to model task relatedness. The goal is to make more related tasks share more model architecture/parameters and less related ones share less.

Figure 7:
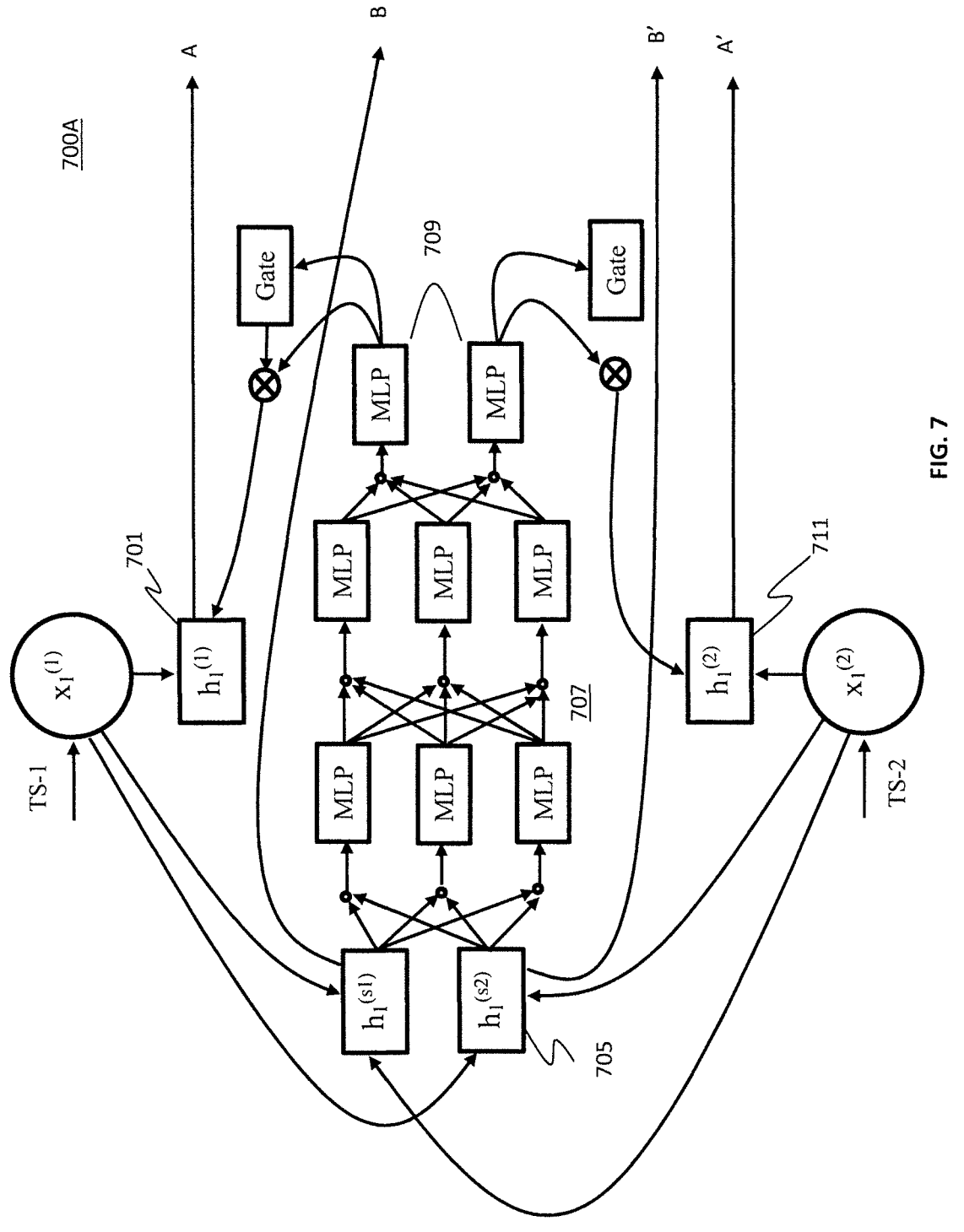
FIGS. 7-8 are block/flow diagrams of an architecture of the tensorized LSTM with adaptive shared memory (TLASM) for modeling temporal patterns of two time series, in accordance with embodiments of the present invention.
Figure 8:
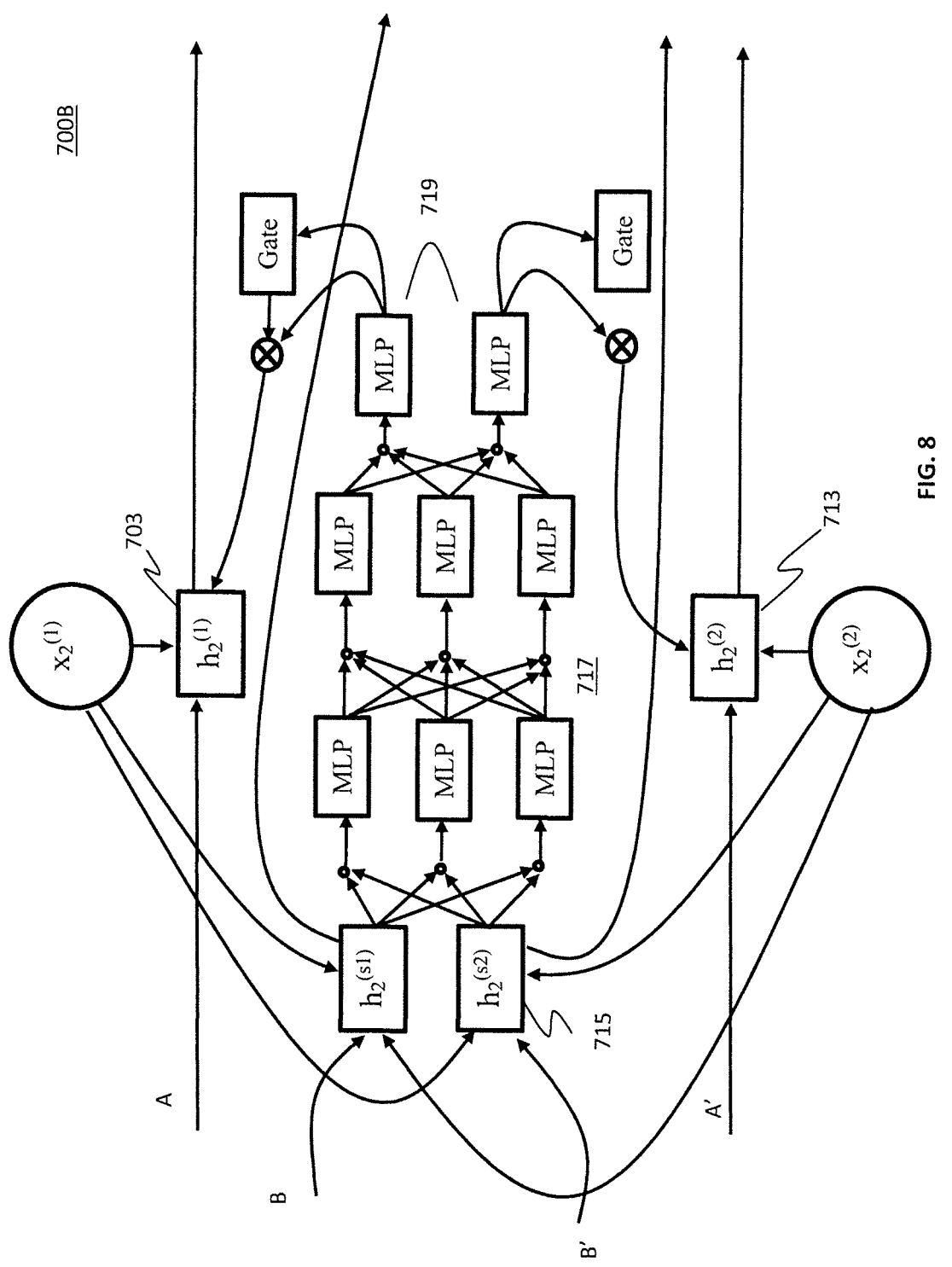

FIGS. 7-8 illustrate the architecture of TLASM 700A-700B, in which the cells 701, 703, 711, 713, are task-specific units and the central components are the adaptive shared memory that includes multiple layers of parallel sub-networks. In the adaptive shared memory module, the first layer includes multiple independent LSTMs 705, 715, followed by several sub-networks 707, 717 including multiple multilayer perceptrons (MLPs). The last layer 709, 719 is task specific MLPs employed to collect information for specific tasks 405 (FIG. 4). The connection between the sub-networks is a weighted average with attention mechanism. All the independent LSTMs and subnetworks are shared by all prediction tasks. The adaptive shared memory learns the connections between the subnetworks to encode the architecture space, which generates different sub-network routings. The adaptive shared memory achieves a flexible parameter sharing by learning to select a similar sub network routing for related tasks. Besides, because the adaptive shared memory includes LSTMs as the first layer to read information from time series at each time step, the adaptive shared memory is able to model the task relatedness that may change over time.

The intuition behind multiple LSTMs included in the adaptive shared memory is that there are different shared hidden feature spaces for the tasks and each LSTM corresponds to one of them. Suppose the $1^{st}$ layer includes p standard LSTMs and the 2nd layer includes q MLPs. After feeding all the trend sequence data into these LSTMs, the outputs at time step t are:

$$(h_t^{(1)}, c_t^{(1)}) = \mathrm{LSTM}_1(h_{t-1}^{(1)}, c_{t-1}^{(1)}, x_t, \theta^{(1)})$$

$$(h_t^{(p)}, c_t^{(p)}) = \mathrm{LSTM}_p(h_{t-1}^{(p)}, c_{t-1}^{(p)}, x_t, \theta^{(p)}).$$

For the sub-network routing between the $1^{st}$ layer and the $2^{nd}$ layer, the exemplary methods use a weighted average of the $1^{st}$ layer's outputs:

$$\begin{bmatrix} e_1 \\ e_2 \\ \vdots \\ e_q \end{bmatrix} = \begin{bmatrix} \alpha_{11} I_{11} & \cdots & \alpha_{1p} I_{1p} \\ \vdots & \ddots & \vdots \\ \alpha_{q1} I_{q1} & \cdots & \alpha_{qp} I_{qp} \end{bmatrix} \begin{bmatrix} h_t^{(1)} \\ h_t^{(2)} \\ \vdots \\ h_t^{(p)} \end{bmatrix},$$

where $\alpha_{ij} \geq 0$ is the weight, $\sum_j \alpha_{ij} = 1$ and $I_{ij}$ is the identity matrix. $\alpha_{ij}$ represents the degree of connection between sub-networks and is learned by an attention module:

$$\alpha_{ij} = \frac{\exp\{w_i^T \tanh(V_i h_t^{(j)})\}}{\sum_{k=1}^{q} \exp\{w_i^T \tanh(V_i h_t^{(k)})\}},$$

where $w_i \in \mathbb{R}^{d_\alpha}$ and $V_i \in \mathbb{R}^{d_\alpha \times d}$ are parameters. The number of attentions used between two layers equals to the number of sub-networks in the latter layer. Similarly, the sub-network routing between other layers is designed. The attentions between different layers are different. As the number of subnetworks in the final layer equals to the number of tasks, e.g., the number of time series, the exemplary method can get the output of the last layer as $R_t = (r_t^1, \ldots, r_t^n)^T$, where $r_t^i \in \mathbb{R}^{d_r}$ is the information read from the shared memory for the i-th time series.

With the tensorized hidden states mechanism and the adaptive shared memory, the exemplary method employs TLASM. The intuition behind TLASM is that the hidden state of time series is influenced by both the information from that time series and the information from related ones. Specifically, each time series has its own memory $c_t^i \in \mathbb{R}^{d_0}$ storing the time series-specific information and the adaptive shared memory $r_t^i \in \mathbb{R}^{d_r}$ storing the information of related time series. When generating the hidden state of the i-th time series $h_t^i$, it needs to read information from both the two memories $r_t^i$ and $c_t^i$.

The calculation process of the TLASM unit is described in the equations below. As a standard LSTM neural network, TLASM has the forget gate $F_t$, input gate $I_t$, output gate $O_t$ and the memory cell $C_t$ in the update process.

Given the input data $x_1, x_2, \ldots \in \mathbb{R}^n$, the cell matrix $C_t$ and the state matrix $H_t$ are calculated as follows:

$$\begin{bmatrix} F_t \\ I_t \\ O_t \end{bmatrix} = \begin{bmatrix} \sigma \\ \sigma \\ \sigma \end{bmatrix} (W \circledast x_t + \mathcal{U} \otimes_n H_{t-1} + B),$$

$$C_t = F_t \odot C_{t-1} + I_t \odot \tilde{C}_t,$$

$$G_t = \sigma(\mathcal{U}_c \otimes_n C_t + \mathcal{U}_r \otimes_n R_t),$$

$$H_t = O_t \odot \tanh(C_t + G_t \odot (\mathcal{U}_g \otimes_n R_t)),$$

where $W \in \mathbb{R}^{3n \times d_0}$, $U \in \mathbb{R}^{3n \times d_0 \times d_0}$, $B \in \mathbb{R}^{3n \times d_0}$, and $U_c$, $U_r$, $U_g \in \mathbb{R}^{n \times d_0 \times d_0}$ are parameters. $\tilde{C}_t$ is the updated state matrix.

$F_t$, $I_t$, $O_t \in \mathbb{R}^{n \times d}$ are the gates in the form of matrix.

$G_t \in \mathbb{R}^{n \times d}$ is a fusion gate. The fusion gate selects a part of the information read from the shared memory, which is merged with the time series-specific memory into a new one for each task.

Similar to the case of tensorizing hidden states, the tensor-dot operations ensure the data used to generate the gates and the memory cell matrix of each time series are exclusively from the corresponding time series. TLASM can also be considered as a set of parallel LSTMs, each of which processes one time series and then merges via the adaptive shared memory.

Regarding the deep architecture with TLASM for learning trends in multivariate time series, the overview of the deep architecture is shown in FIG. 4. The sequences of historical trends of all time series are fed into TLASM 401 to learn the long-term trend evolving. A multi-task 1dCNN 403 is applied to the local raw data of each time series to extract local features. The outputs of TLASM 401 and 1dCNN 403 are further fed into a task-specific subnetwork to get the final trend prediction of that time series.

Regarding TLASM for learning long-term trend evolving, the trend sequences of all time series, e.g., $\mathcal{T} = \{\mathcal{L} \, l_k^1, \, s_k^1$ $\rangle\} \cup \ldots \cup \{\mathcal{L} \, l_k^n, \, s_k^n\rangle\}$, are fed into TLASM to learn long-term trend evolving. Specifically, the exemplary methods concatenate l and s of all time series as the input data $x_t = (l_t^1, s_t^1, \ldots, l_t^n, s_t^n)^T \in \mathbb{R}^{2n}$. The output of TLASM, $H \in \mathbb{R}^{2n \times d}$, is the transformed representation of all trend sequences. The exemplary method denotes $L^i(\mathcal{T})$ as the part of H that corresponds to the i-th time series Regarding multi-task 1dCNN for learning local features, to extract the features of local time series data, DeepTrends 400 employs a multi-task 1CNN module which enjoys the classic architecture of the shared bottom MTL. In the module, a low-level subnetwork is shared by all time series and each time series has its own subnetwork built on top of the shared one. All these subnetworks include multiple stacked layers of 1d convolutional, activation and pooling operations. The elements of local data $\mathcal{L} = \{\mathcal{L} \, x_{t_k-w}^1, \ldots, x_{t_k}^1\rangle\} \cup \ldots \cup \{\mathcal{L} \, x_{t_k-w}^n, \ldots, x_{t_k}^n\rangle\}$ are fed into the multi-task 1dCNN module. The output that corresponds to the i-th time series is denoted by $C^i(\mathcal{L})$.

Regarding task-specific sub-networks, the exemplary methods design a task-specific sub-network for the trend learning of each time series. The outputs of TLASM and multi-task 1dCNN, e.g., $L^i(\mathcal{T})$ and $C^i(\mathcal{L})$, are concatenated and fed into the task-specific sub-network. The output of the sub-network for the i-th time series is:

$$\langle \hat{l}^i, \hat{s}^i \rangle = f^i(L^i(\mathcal{T}) \oplus C^i(\mathcal{L})),$$

where $f^i(\bullet)$ represents an MLP that includes of m layers of neurons. The output of the k-th layer can be expressed as $y_k = \varphi(W_k^i(y_{k-1}) + b_k^i)$, where $\varphi$ is the leaky ReLU activation function and $W_k^i$, $b_k^i$ are parameters.

Regarding the objective function, given the trend sequences $\mathcal{T}$ and the local data $\mathcal{L}$, the objective function is:

$$J = \frac{1}{n} \sum_{i=1}^n \frac{1}{z^i} \sum_{k=1}^{z^i} \left[ \left( \hat{l}_k^i - l_k^i \right)^2 + \left( \hat{s}_k^i - s_k^i \right)^2 \right] + \lambda P_{nn},$$

where $z^i$ is the number of trends in the i-th time series and $P_{nn}$ is the penalization term for the parameters to prevent the model from over-fitting. $\lambda$ is a hyper-parameter.

In summary, the exemplary embodiments introduce a deep architecture, DeepTrends, for learning trends in multivariate time series. The core module of DeepTrends is a TLASM network, which is used to capture the long-term dependency in the historical trend sequence. Particularly, TLASM tensorizes the hidden states to model the complex temporal patterns in different tasks. An adaptive shared memory is introduced to learn the task relatedness and dynamically integrates the shared information from related tasks into the learning process of individual tasks. To consider the short-term dependency between the local data and the subsequent trend, a multi-task 1dCNN is designed to extract the features of local raw time series. A task-specific sub-network is further designed to integrate the long- and short-term dependency.

Figure 9:
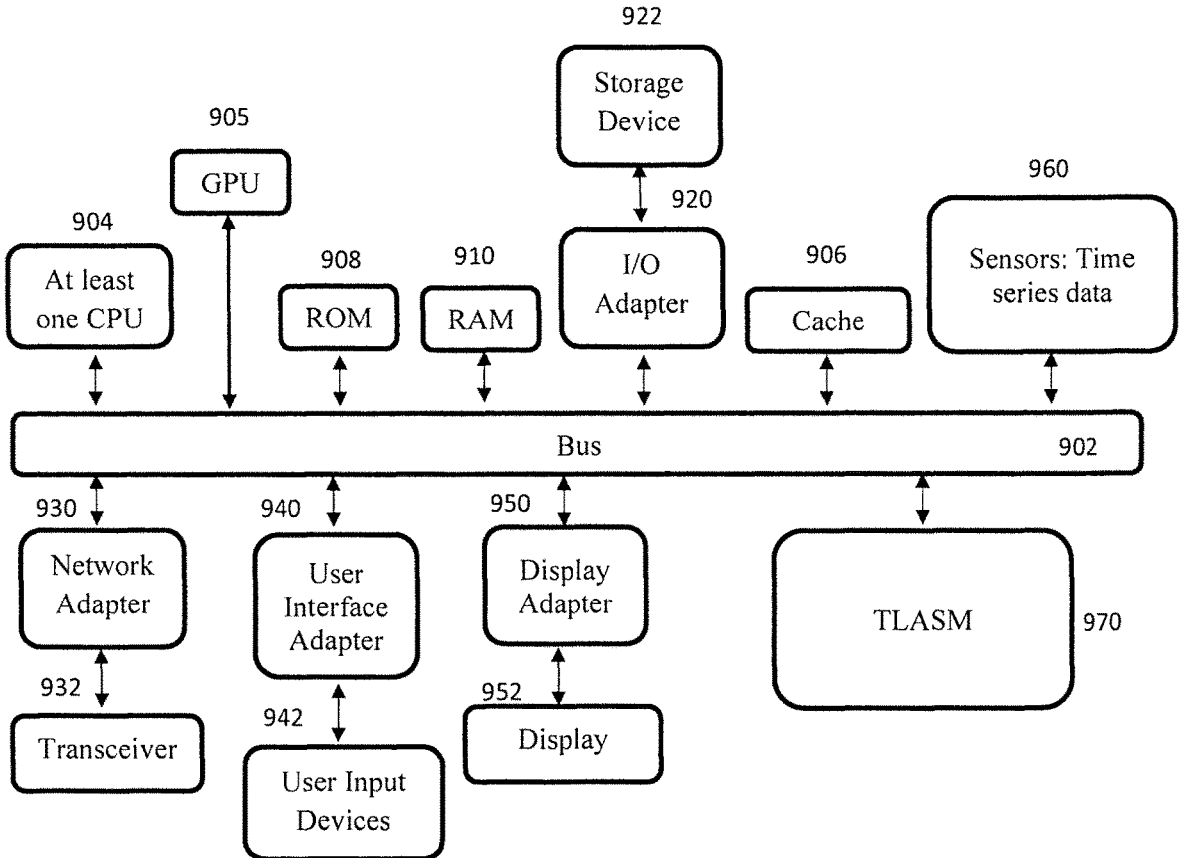
FIG. 9 is block/flow diagram of an exemplary processing system for unsupervised multivariate time series trend detection for group behavior analysis, in accordance with embodiments of the present invention.

FIG. 9 is block/flow diagram of an exemplary processing system for unsupervised multivariate time series trend detection for group behavior analysis, in accordance with embodiments of the present invention.

The processing system includes at least one processor or processor device (CPU) 904 and a graphics processing unit (GPU) 905 operatively coupled to other components via a system bus 902. A cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Sensors for collecting time series data 960 can be employed via the bus 602. The time series data can be analyzed with the TLASM 970.

A storage device 922 is operatively coupled to system bus 902 by the I/O adapter 920. The storage device 922 can be any of a disk storage device (e.g., a magnetic or optical disk storage device), a solid state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 10:
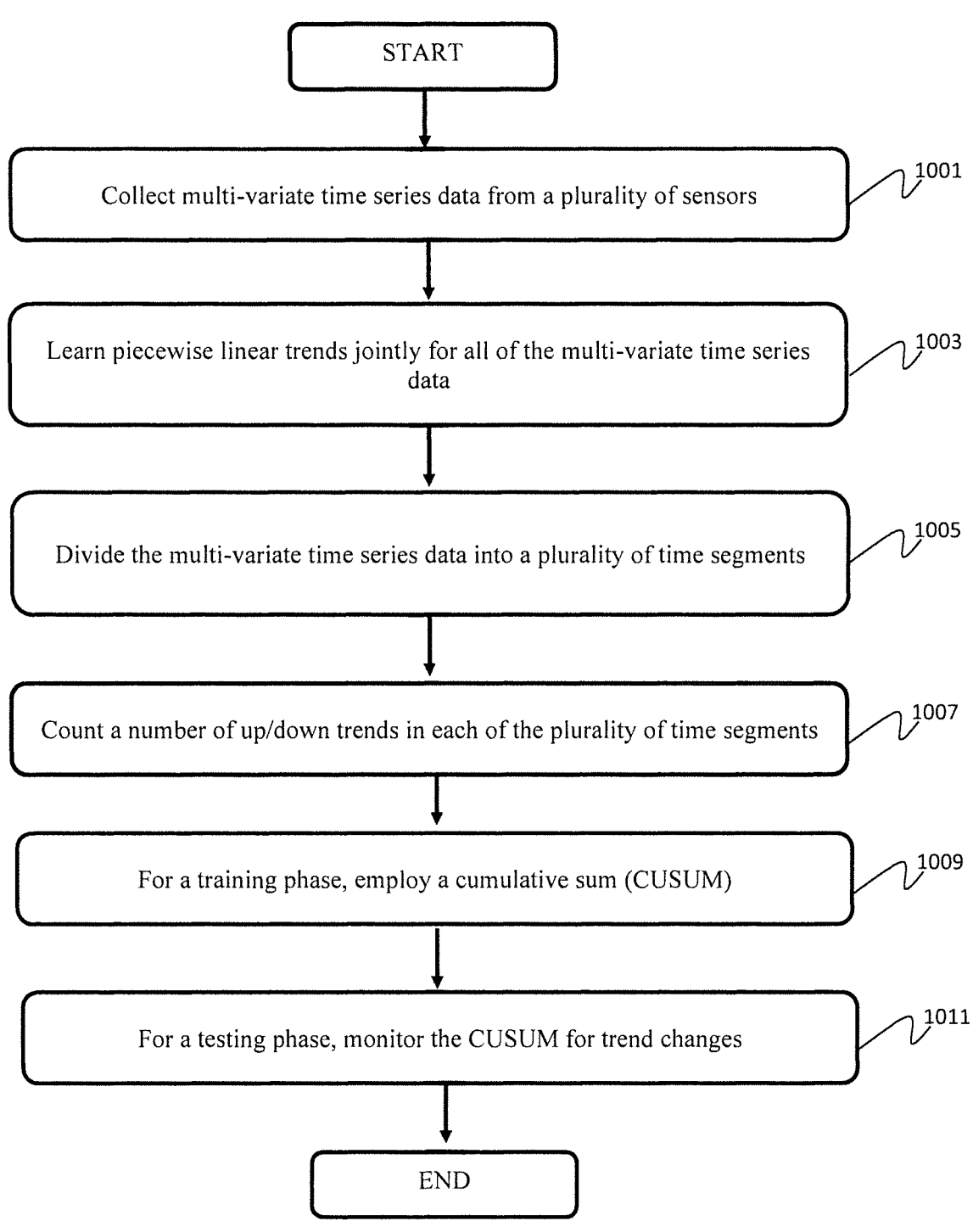
FIG. 10 is a block/flow diagram of an exemplary method for unsupervised multivariate time series trend detection for group behavior analysis, in accordance with embodiments of the present invention.

FIG. 10 is a block/flow diagram of an exemplary method for unsupervised multivariate time series trend detection for group behavior analysis, in accordance with embodiments of the present invention.

At block 1001, collect multi-variate time series data from a plurality of sensors.

At block 1003, learn piecewise linear trends jointly for all of the multi-variate time series data.

At block 1005, divide the multi-variate time series data into a plurality of time segments.

At block 1007, count a number of up/down trends in each of the plurality of time segments.

At block 1009, for a training phase, employ a cumulative sum (CUSUM).

At block 1011, for a testing phase, monitor the CUSUM for trend changes.

FIG. 11 is a block/flow diagram of equations employed in methods for unsupervised multivariate time series trend detection for group behavior analysis, in accordance with embodiments of the present invention.

Equations 1100 identify a learning piecewise linear trends for all time series jointly, a CUSUM, an attention module, and an objective function.

Figure 12:
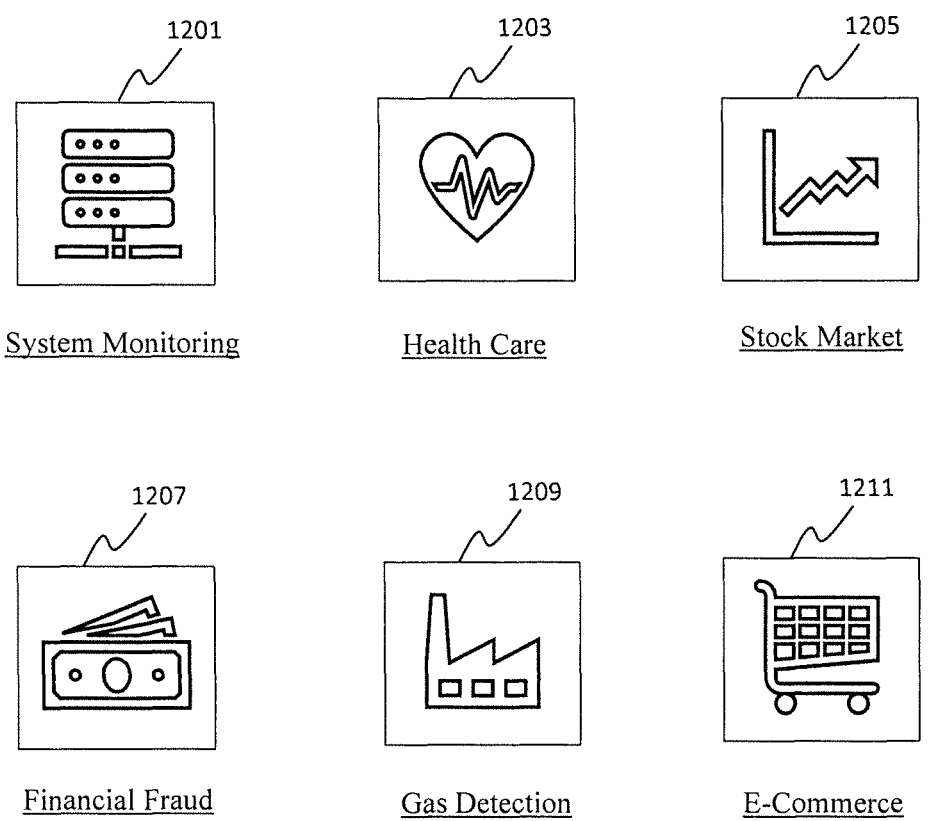
FIG. 12 is a block/flow diagram of practical applications for unsupervised multivariate time series trend detection for group behavior analysis, in accordance with embodiments of the present invention.

FIG. 12 is a block/flow diagram of practical applications for unsupervised multivariate time series trend detection for group behavior analysis, in accordance with embodiments of the present invention.

Figure 15:
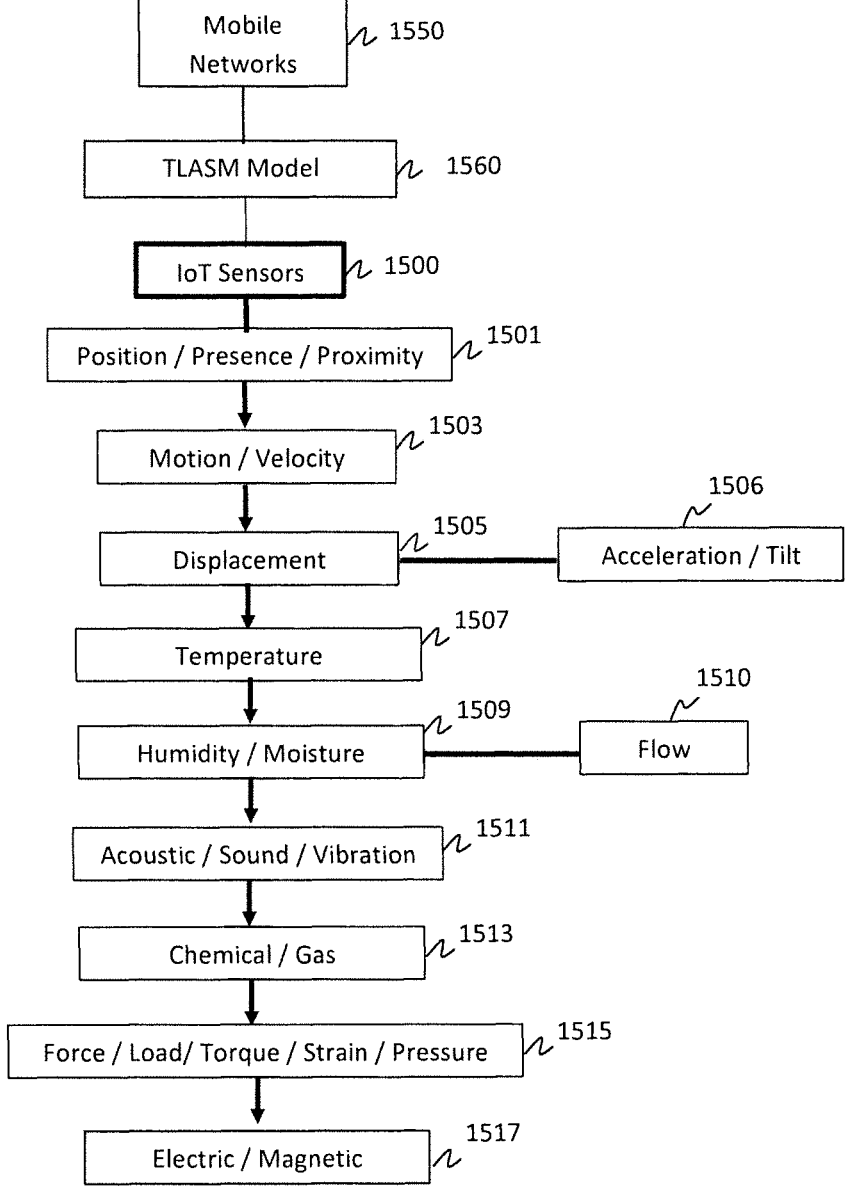
FIG. 15 is a block/flow diagram of exemplary IoT sensors used to collect data/information for unsupervised multivariate time series trend detection for group behavior analysis, in accordance with embodiments of the present invention.

Practical applications for learning and forecasting trends in multivariate time series data can include, but are not limited to, system monitoring 1201, healthcare 1203, stock market data 1205, financial fraud 1207, gas detection 1209, and e-commerce 1211. The time-series data in such practical applications can be collected by sensors 1500 (FIG. 15).

Figure 13:
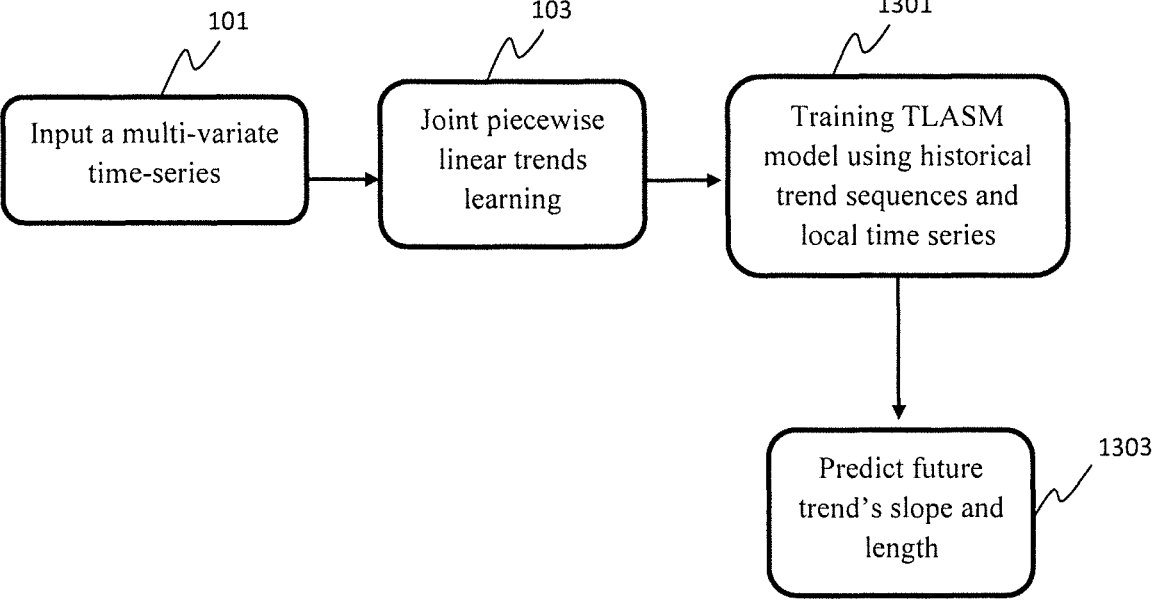
FIG. 13 is a block/flow diagram of method for tensorized LSTM with adaptive shared memory for learning trends in multivariate time series, in accordance with embodiments of the present invention.

FIG. 13 is a block/flow diagram of method for tensorized LSTM with adaptive shared memory for learning trends in multivariate time series, in accordance with embodiments of the present invention.

At block 101, a multi-variate time series is input.

At block 103, joint piecewise linear trends are learned.

At block 1301, the TLASM model is trained using historical trend sequences and local time series.

At block 1303, the future trend's slope and length are predicted.

FIG. 14 are block/flow diagrams of training the TLASM model and predicting future trend's slope and length, in accordance with embodiments of the present invention.

At block 1401, the TLASM model is trained using historical trend sequences and local time series.

At block 1411, the framework in FIG. 4 is employed to train the prediction model.

At block 1413, the model uses 1dCNN to learn the local short-term time series patterns and tensorized LSTM with adaptive shared memory for learning long-term trend sequences.

At block 1403, the future trend's slope and length are predicted.

At block 1421, the prediction feeds the learned model and recent trend sequences and most recent short-term raw time series to predict near future trend of each time series.

At block 1423, the learning procedure is by nature a multi-task way.

FIG. 15 is a block/flow diagram of exemplary IoT sensors used to collect data/information for unsupervised multivariate time series trend detection for group behavior analysis, in accordance with embodiments of the present invention.

IoT loses its distinction without sensors. IoT sensors act as defining instruments which transform IoT from a standard passive network of devices into an active system capable of real-world integration.

The IoT sensors 1500 can be connected via the mobile networks 1550 to transmit information/data, continuously and in in real-time. Exemplary IoT sensors 1500 can include, but are not limited to, position/presence/proximity sensors 1501, motion/velocity sensors 1503, displacement sensors 1505, such as acceleration/tilt sensors 1506, temperature sensors 1507, humidity/moisture sensors 1509, as well as flow sensors 1510, acoustic/sound/vibration sensors 1511, chemical/gas sensors 1513, force/load/torque/strain/pressure sensors 1515, and/or electric/magnetic sensors 1517. One skilled in the art can contemplate using any combination of such sensors to collect data/information and input into the TLASM model 1560 of the mobile networks 1550 for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

FIG. 16 is a block/flow diagram of an exemplary method for tensorized LSTM with adaptive shared memory for learning trends in multivariate time series, in accordance with embodiments of the present invention.

At block 1601, collect multi-variate time series data from a plurality of sensors At block 1603, jointly learn both local and global contextual features for predicting a trend of the multivariate time series by employing a tensorized long short-term memory (LSTM) with adaptive shared memory (TLASM) to learn historical dependency of historical trends.

At block 1605, employ a multi-task one-dimensional convolutional neural network (1dCNN) to extract salient features from local raw time series data to model a short-term dependency between local time series data and subsequent trends.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for executing a multi-task deep learning model for learning trends in multivariate time series, the method comprising:
collecting multi-variate time series data about healthcare from a plurality of sensors;
jointly learning both local and global contextual features for predicting a trend of the multivariate time series about healthcare by employing a tensorized long short-term memory (LSTM) with adaptive shared memory (TLASM) to learn historical dependency of historical trends, the TLASM including multiple layers of parallel sub-networks, a first layer of each sub-network including multiple independent LSTMs followed by multiple layers of multilayer perceptrons (MLPs), and a last layer of a plurality of task-specific MLPs, wherein all the independent LSTMs and the multiple layers of MLPs are shared by all prediction tasks, and a connection between the sub-networks is a weighted average with an attention mechanism; and
employing a multi-task one-dimensional convolutional neural network (1dCNN) to extract salient features from local raw time series data about healthcare to model a short-term dependency between local time series data and subsequent trends, wherein each of the independent LSTMs directly communicates with each MLP of a first layer of MLPs of the multiple layers of MLPs.

2. The method of claim 1, wherein the adaptive shared memory models task relatedness that changes over time as a result of the first layer of each sub-network including the independent LSTMs.

3. The method of claim 1, wherein the TLASM learns sub-network connections between different layers for information routing.

4. The method of claim 3, wherein the TLASM models long-term dependency within a sequence of the historical trends.

5. The method of claim 4, wherein a task-specific sub-network is implemented to integrate the long-term dependency and the short-term dependency.

6. The method of claim 1, wherein a number of attentions used between a first layer and a second layer equals a number of sub-networks in the second layer.

7. The method of claim 1, wherein the attention mechanism is given as:

$$\alpha_{ij} = \frac{\exp\{w_i^T \tanh(V_i h_t^{(j)})\}}{\sum_{k=1}^{q} \exp\{w_i^T \tanh(V_i h_t^{(k)})\}},$$

where $w_i \in \mathbb{R}^{d_a}$ and $V_i \in \mathbb{R}^{d_a \times d}$ are parameters and h represent hidden state vectors.

8. A non-transitory computer-readable storage medium comprising a computer-readable program for executing a multi-task deep learning model for learning trends in multivariate time series, wherein the computer-readable program when executed on a computer causes the computer to perform the steps of:
collecting multi-variate time series data about healthcare from a plurality of sensors;
jointly learning both local and global contextual features for predicting a trend of the multivariate time series about healthcare by employing a tensorized long short-term memory (LSTM) with adaptive shared memory (TLASM) to learn historical dependency of historical trends, the TLASM including multiple layers of parallel sub-networks, a first layer of each sub-network including multiple independent LSTMs, followed by multiple layers of multilayer perceptrons (MLPs), and a last layer of a plurality of task-specific MLPs, wherein all the independent LSTMs and the multiple layers of MLPs are shared by all prediction tasks, and a connection between the sub-networks is a weighted average with an attention mechanism; and
employing a multi-task one-dimensional convolutional neural network (1dCNN) to extract salient features from local raw time series data about healthcare to model a short-term dependency between local time series data and subsequent trends,
wherein each of the independent LSTMs directly communicates with each MLP of a first layer of MLPs of the multiple layers of MLPs.

9. The non-transitory computer-readable storage medium of claim 8, wherein the adaptive shared memory models task relatedness that changes over time as a result of the first layer of each sub-network including the independent LSTMs.

10. The non-transitory computer-readable storage medium of claim 8, wherein the TLASM learns connections between different layers for information routing.

11. The non-transitory computer-readable storage medium of claim 10, wherein the TLASM models optimizes long-term dependency within a sequence of the historical trends.

12. The non-transitory computer-readable storage medium of claim 11, wherein a task-specific sub-network is implemented to integrate the long-term dependency and the short-term dependency.

13. The non-transitory computer-readable storage medium of claim 8, wherein a number of attentions used between a first layer and a second layer equals to a number of sub-networks in the second layer.

14. The non-transitory computer-readable storage medium of claim 8, wherein the attention mechanism is given as:

$$\alpha_{ij} = \frac{\exp\{w_i^T \tanh(V_i h_t^{(j)})\}}{\sum_{k=1}^{q} \exp\{w_i^T \tanh(V_i h_t^{(k)})\}},$$

where $w_i \in \mathbb{R}^{d_\alpha}$ and $V_i \in \mathbb{R}^{d_\alpha \times d}$ are parameters and h represent hidden state vectors.

15. A system for executing a multi-task deep learning model for learning trends in multivariate time series, the system comprising:

a memory; and one or more processors in communication with the memory configured to:

collect multi-variate time series data about healthcare from a plurality of sensors;

jointly learn both local and global contextual features for predicting a trend of the multivariate time series about healthcare by employing a tensorized long short-term memory (LSTM) with adaptive shared memory (TLASM) to learn historical dependency of historical trends, the TLASM including multiple layers of parallel sub-networks, a first layer of each sub-network including multiple independent LSTMs, followed by multiple layers of multilayer perceptions (MLPs), and a last layer of a plurality of task-specific MLPs, wherein all the independent LSTMs and the multiple layers of MLPs are shared by all prediction tasks, and a connection between the sub-networks is a weighted average with an attention mechanism; and employ a multi-task one-dimensional convolutional neural network (1dCNN) to extract salient features from local raw time series data about healthcare to model a short-term dependency between local time series data and subsequent trends, wherein each of the independent LSTMs directly communicates with each MLP of a first layer of MLPs of the multiple layers of MLPs.

16. The system of claim 15, wherein the adaptive shared memory models task relatedness that changes over time as a result of the first layer of each sub-network including the independent LSTMs.

17. The system of claim 15, wherein the TLASM learns optimizes sub-network connections between different layers for information routing.

18. The system of claim 17, wherein the TLASM models long-term dependency within a sequence of the historical trends.

19. The system of claim 18, wherein a task-specific sub-network is implemented to integrate the long-term dependency and the short-term dependency.

20. The system of claim 15, wherein a number of attentions used between a first layer and a second layer equals to a number of sub-networks in the second layer.

* * * * *